United States Patent [19]
Gunther

[11] 3,954,425
[45] May 4, 1976

[54] ABSORPTION OF $SO_2$ FROM A DILUTE GAS AND DESORBING IT AT HIGHER CONCENTRATIONS INTO A STRIPPING GAS

[75] Inventor: Arnold Gunther, West Orange, N.J.
[73] Assignee: Treadwell Corporation, New York, N.Y.
[22] Filed: Apr. 27, 1973
[21] Appl. No.: 355,289

Related U.S. Application Data
[63] Continuation-in-part of Ser. No. 132,752, April 9, 1971, abandoned, which is a continuation-in-part of Ser. No. 860,138, Aug. 13, 1969, abandoned, which is a continuation-in-part of Ser. No. 724,565, April 26, 1968, abandoned.

[52] U.S. Cl. .................................. 55/44; 55/47; 55/48; 55/55; 55/56; 55/73
[51] Int. Cl.² ................... B01D 19/00; B01D 53/14
[58] Field of Search ............... 55/47, 55, 56, 44, 73, 55/48; 423/243, 523

[56] References Cited
UNITED STATES PATENTS
| | | | |
|---|---|---|---|
| 1,398,791 | 11/1921 | Pascal | 423/523 |
| 1,751,103 | 10/1924 | Schroeder | 55/73 |
| 1,901,416 | 3/1933 | Schroeder | 55/73 X |
| 2,047,819 | 7/1936 | Boswell et al. | 423/243 |
| 3,511,027 | 5/1970 | Roberts et al. | 55/73 X |

FOREIGN PATENTS OR APPLICATIONS
| | | | |
|---|---|---|---|
| 957,260 | 5/1964 | United Kingdom | 55/68 |

Primary Examiner—Charles N. Hart
Assistant Examiner—Richard W. Burks
Attorney, Agent, or Firm—Robert Ames Norton; Saul Leitner

[57] ABSTRACT

Relatively dilute $SO_2$ containing gases, such as tail gases from sulfuric acid plants, combustion gases from high sulfur fuels, and the like, are treated with a solvent, such as water, at approximately atmospheric pressures to dissolve the $SO_2$, and the solution is then stripped at subatmospheric pressure with a gas, such as air, or a reducing gas if the $SO_2$ is to be finally recovered as sulfur. The sub-atmospheric pressure may be attained by expansion of the stripping gas in a suitable gas expansion machine, and the stripped gas is then recompressed to a pressure, such as substantially atmospheric, at which final utilization of the stripped $SO_2$ takes place.

4 Claims, 2 Drawing Figures

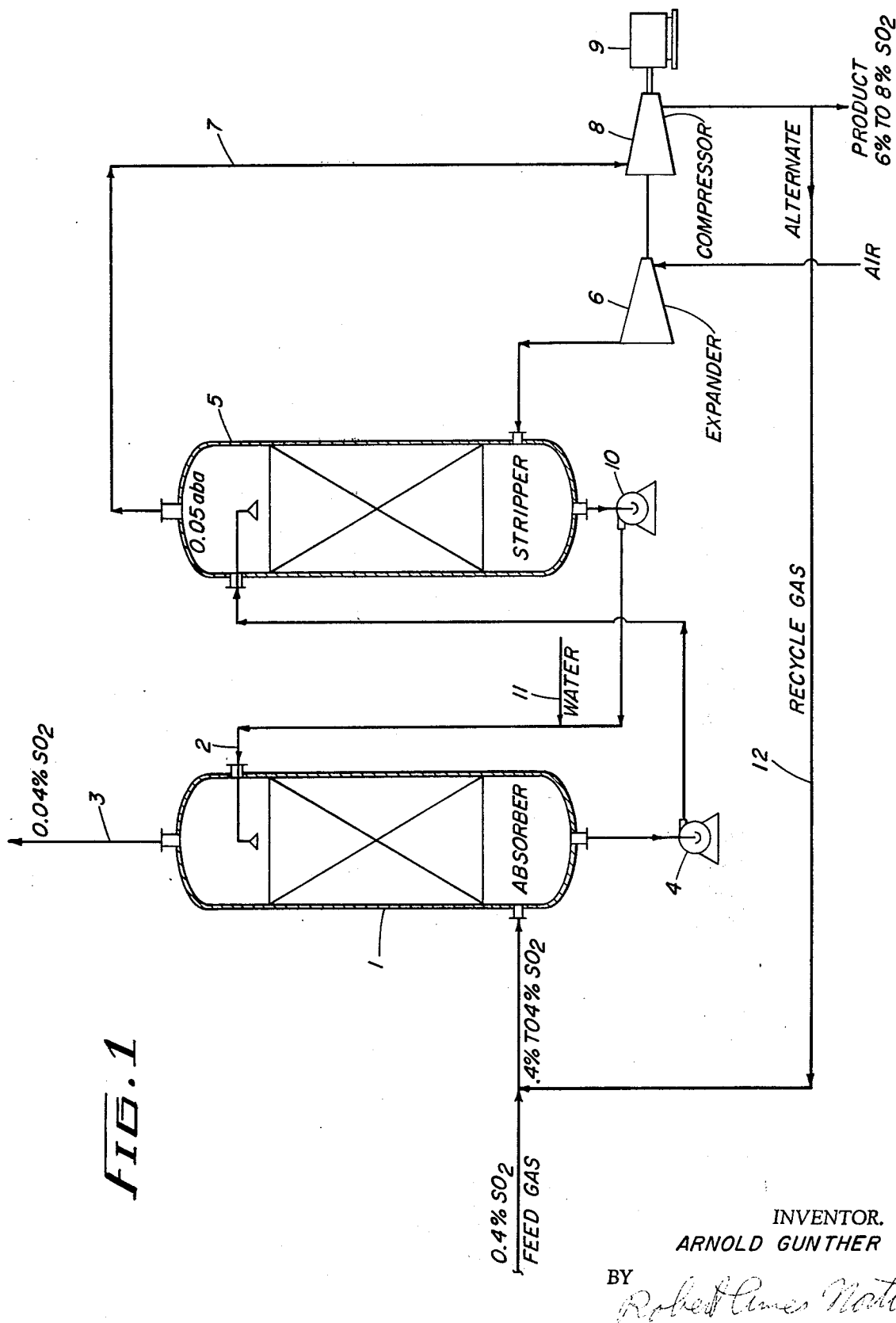

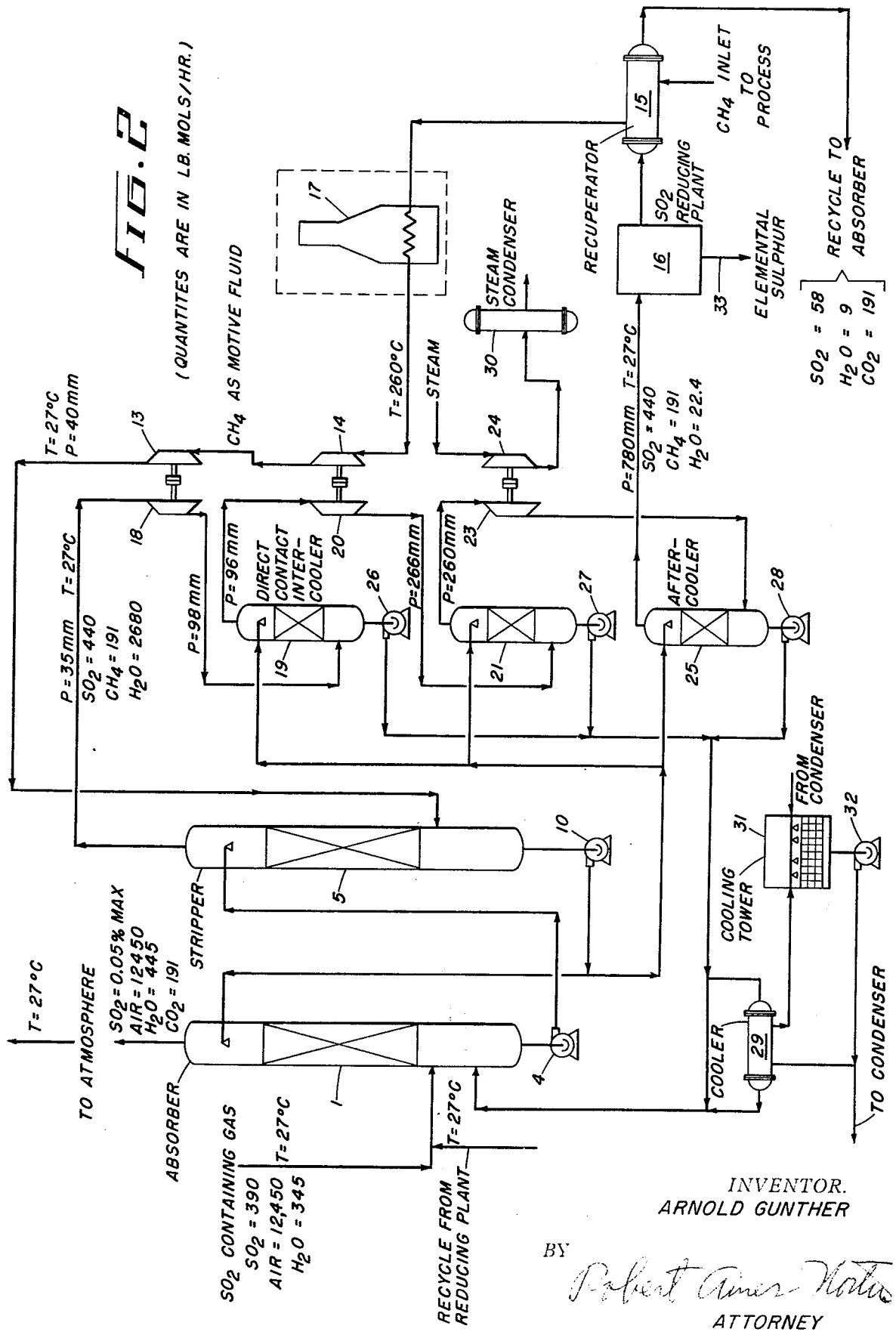

ABSORPTION OF SO₂ FROM A DILUTE GAS AND DESORBING IT AT HIGHER CONCENTRATIONS INTO A STRIPPING GAS

RELATED APPLICATIONS

This application is a continuation-in-part of my co-pending application Ser. No. 132,752, filed Apr. 9, 1971, which in sequence is a continuation-in-part of Ser. No. 860,138, filed Aug. 13, 1969, which is in turn a continuation-in-part of my earlier co-pending application Ser. No. 724,565, filed Apr. 26, 1968. These earlier applications are now abandoned.

BACKGROUND OF THE INVENTION

There are many sources of dilute $SO_2$ containing gases, such as, for example, tail gases from contact sulfuric acid plants, combustion gases from high sulfur fuel, and the like. These gases if directly discharged into the atmosphere contribute to air pollution and the $SO_2$ content is wasted. It has been proposed in the past to recover a large proportion of the $SO_2$ in a more concentrated form. This has been described, for example as in U.S. Pat. No. of Schroeder 1,901,416, in which $SO_2$ under pressure of, for example, up to 20 atmospheres is absorbed in water. The $SO_2$ is then stripped from the solution by means of air at a lower pressure, substantially atmospheric pressure. The gas stream with the desorbed $SO_2$ can then be used for many purposes for which the waste gases with their very low $SO_2$ content are unsuitable.

The Schroeder process does effect a concentration of $SO_2$, but at the cost of compression of the dilute gas, the mass of which per unit of $SO_2$ is relatively high, the process requiring, therefore, a large amount of power. The process of Schroeder, therefore, although perfectly operative, incurs a high power cost, which has interfered with economic operation. Another process is described in the Roberts et al U.S. Pat. No. 3,511,027, May 12, 1970. In this process the solution of $SO_2$ in water is desorbed by a series of flash chambers at decreasing pressures with the flash vapors compressed, cooled to condense out water and finally at substantially ambient pressure constituting a product gas. It will be noted that in the Roberts et al process multiple flashing is used but no fixed stripping gas.

SUMMARY OF THE INVENTION

The present invention deals with an improved method of concnetration $SO_2$ from very dilute gases using water as an absorbent and desorbing at reduced pressures using mechanical energy to compress the gas which is desorbed to approximately ambient pressure.

In the practical application of the invention we deal with large volumes of dilute gas, e.g., from power plants or metallurgical smelters. It is impractical to compress the gas prior to absorption as is proposed, for example, in the Schroeder patent referred to above. In the invention the absorption is therefore conducted at ambient pressure in a packed tower in which the absorbent water flows down against an upward flow of the gas. It is also possible to use a cross flow packed absorber provided with multiple stages.

Whatever absorber is employed the mass flow of water in absorption and desorption is large in relation to the $SO_2$ which is absorbed from very dilute gases at ambient pressure. It would be economically impractical to desorb the $SO_2$ at elevated temperatures because of the very high requirement of heat transfer that is required for the sensible heat of the water.

It is possible, of course, to release the $SO_2$ at reduced pressures. According to the gas laws the partial pressure of $SO_2$ in the gas phase in the last stage of desorption is approximately the same as the very low partial pressure in the gas which leaves the absorber. Therefore the total pressure in desorption is necessarily very low and the gas phase at the low pressure contains a considerably larger volume of water vapor than of $SO_2$. It requires considerable energy and very large compressor displacement to compress this gas and water vapor to ambient pressure using the methods of the prior art.

I have discovered that it is possible to utilize air or other fixed gas under vacuum to strip $SO_2$ from the absorber solution and then compress the overhead gas to ambient pressure using multistage compressors with intercooling to remove vapor by condensation. If this is done in a stripping column with countercurrent contact and mass transfer between the aqueous solution and the stripping gas, the energy requirement to compress the overhead gas to ambient pressure, utilizing the teaching of this invention, is comparable to the efficiency obtainable in the Roberts et al process when the latter is operating with a very complicated plant using a large number of apparatus elements. The present invention using a fixed stripping gas and its other features thus requires substantially a minimum of apparatus complexity and hence relatively low plant cost.

It would be expected, a priori, the additional burden of compression of a stripping gas in addition to $SO_2$ and water vapor in the present invention would place it at a disadvantage when compared with Roberts. It turns out, however, that with equivalent process complexity and starting from the same feed gas and with equivalent $SO_2$ recovery, the contrary is the case.

This unanticipated advantage of the present invention stems from the fact that the use of a stripping gas results in a process in which there may be multistage countercurrent mass transfer of $SO_2$ from the liquid without having interstage compression of the vapor and without the highly irreversible flash of $SO_2$ and water vapor from the rich solution entering the desorber.

In the present invention the use of a fixed stripping gas results in the practical advantage of process simplicity combined with a relatively high degree of efficiency in the utilization of energy for concentrating the $SO_2$. In other words the present invention is not a compromise between high efficiency of energy utilization and savings in plant cost.

The product gas which is obtained in accordance with this invention contains $SO_2$ and the stripping gas which is selected in accordance with the purpose and ultimate disposal of the $SO_2$. For example, if the end product is sulfuric acid the stripping gas may be air in the amount which produces a mixture which is suitable for conversion to acid. If the end product is to be elemental sulfur, the stripping gas may be of such character and in such proportion which, is suitable as a feed, or component thereof, to a modified Claus plant to produce elemental sulfur. For example, the stripping gas may be natural gas, synthesis gas or other suitable reducing gas.

The $SO_2$-containing gas which is the feed gas to the absorber may consist of the gaseous products of fuel combustion, smelter off-gas, sulfuric acid plant off-gas or Claus plant off-gas.

This invention is limited in its utility to the treatment of gas streams which are to be treated to produce a stack gas containing less than 2 percent $SO_2$ after absorption and in which the overhead from the stripper is to contain more than 6 percent $SO_2$.

BRIEF DESCRIPTION OF THE DRAWINGS

FIG. 1 is a simplified flow sheet diagram for a modification receiving stack gases from a sulfuric acid plant and uses air as a stripping or desorbing gas;

FIG. 2 is a similar flow sheet less simplified taking $SO_2$ containing gases from a copper converter using methane as a stripping gas and including a sulfur dioxide reduction plant of a modified Claus type.

DESCRIPTION OF THE PREFERRED EMBODIMENTS

The description of the equipment will first be made in connection with the use of air as a stripping gas. This will be followed by further examples which describe stripping with a hydrogen-containing gas, such as methane.

FIG. 1 shows a feed gas of 0.4% $SO_2$ entering an absorber 1. The absorber is of standard construction, such as packed tower. Water, or actually stripped solution from the stripper as will be described, is introduced into the tower through the pipe 2 and off gases leave the top of the absorber through the pipe 3 at a concentration sufficiently low so that they are not serious air pollutants. The water absorbs up to about 90% of the $SO_2$. To give a practical set of figures, the water entering the top of the absorber may contain $1 \times 10^{-5}$ mol fraction of $SO_2$ and $SO_2$ is absorbed to produce a solution having $19 \times 10^{-5}$ mol fraction $SO_2$. The flow of water is about 5700 gallons per minute. The feed gas coming in may have an average of 0.4% $SO_2$ and flow at the rate of 50,000 scfm, which figures as 7900 lb. mols/hr. The absorption causes a certain amount of heating, which, however, is taken up by the evaporation of some water and by desorption of $SO_2$ in the desorber.

The solution of $SO_2$ leaving the bottom of the tower is pumped by the pump 4 into a stripper 5 which is of the same general design as the absorber 1. However, as will be pointed out below, it operates under quite different conditions.

Air is expanded through the turbine 6 from atmospheric pressure to about 0.05 atmospheres and enters the bottom of the stripper column 5. Desorption takes place, and the desorbed $SO_2$ passes through the pipe 7 into a compressor 8. This is shown as driven by a motor 9 and is shown diagrammatically as a single stage compressor, although in practical operation it is frequently desirable to use a multistage compressor, if necessary with interstage cooling. The desorbed gas is compressed to approximately atmospheric pressure and contains from 6% to 8% $SO_2$. It is shown leaving the compressor 8 either going to a product or, as will be described below, recycling.

A good portion of the power required in the compressor stage 8 is furnished by the expansion turbine 6, and this can be further increased by supplying waste heat to the air entering the expander turbine 6 from any suitable source, such as waste heat from stack gases and the like. If sufficient heat is added, the expansion turbine may produce almost enough or even slightly more power than is needed in the compression stages. The addition of heat through standard heat exchanges is not shown on the drawing as it can be effected in conventional apparatus.

The stripped liquor, which is stripped down to about $1 \times 10^{-5}$ mol fractions $SO_2$, is then pumped back by the pump 10 into the absorber 1. Here it absorbs $SO_2$ again and the cycle is repeated continuously. As a certain amount of water is evaporated in the absorber 1 and also in the stripper 5, some water needs to be added, and this is shown at 11 as make-up water.

An alternative operation is shown by a connection marked Alt. through a recycle gas conduit 12 back into the absorber. This can be a small portion of the product gas where the feed gas drops down to a content of $SO_2$ which is too low to produce the desired concentration in the final product or where it is necessary to concentrate to still higher $SO_2$ contents, as for example when liquid $SO_2$ is going to be the final product.

The following gives the concentrations of the gas leaving the top of the stripper 5:

| | |
|---|---|
| Air (bone dry basis) | 319 lb.mol/hr. |
| $SO_2$ | 28.4 lb.mol/hr. |
| $CO_2$ | 8 lb.mol/hr. |
| $H_2O$ | 90.5 lb.mol/hr. |

The temperature of this gas is 40°F. and its pressure 0.563 psia. The product stream, leaving compressor 8 and after being cooled down to 95°F., will contain about 6% of $H_2O$ and its composition will be:

| | | |
|---|---|---|
| ($SO_2$ | 28.4 lb. mol/hr.) | |
| ($CO_2$ | 8 lb. mol/hr.) | at 1 atm and 95°F. |
| (Air | 319 lb. mol/hr.) | |
| (Water | 23 lb. mol/hr.) | |

FIG. 2 illustrates a more elaborate system using methane as the stripping gas and including a sulfur dioxide reducing plant. All of the quantities of gases are in lb.mols/hr. Pressure is indicated by the symbol P and is in millimeters of mercury absolute. Temperature has the symbol $t$.

It will be noted that the incoming $SO_2$ containing gas is approximately 3%, much more concentrated than in FIG. 1, and is a typical value of an $SO_2$ gas from a copper converter. It will be noted that the recompression of the stripped $SO_2$ gas is in multi-stage compressors with intercooling, and as the amount of the power for compression which can be recovered by expansion of the methane stripping gas depends on a number of operating factors, the drawing illustrates a situation where a portion of the power of compression is obtained from another source, steam. This is symbolized by running two of the recompressors with methane expansion turbines and one with a steam turbine.

The absorber and stripper are of the same design as in FIG. 1 and, therefore, bear the same reference numerals 1 and 2. Also, absorber liquid discharge is through the same type of pump 4, and stripped liquid from the stripper 5 is pumped by the pump 10. However, as will be described below, only a portion of the stripped liquid is directly recycled to the absorber, whereas in FIG. 1 all of the liquid was so recycled directly.

In the stripper 5 instead of introducing low pressure air, as in FIG. 1, methane is introduced at about 40 mm Hg. absolute. This methane came from two methane expansion turbines 13 and 14 instead of a single air expansion turbine shown in the more simplified flow sheet of FIG. 1. The methane comes from a methane source indicated on the right hand side of the drawing and is heated in a recuperator 15 by off gases from an $SO_2$ reducing plant 16. Further heat may be imparted to the stream by the indirect heater 17 if required. As this is optional, the heater is shown inclosed in a dashed line box.

Stripping with the low pressure methane is effected in the stripper 5 in the same general manner as the stripper operated with low pressure air in FIG. 1. The stripped gases, at very slightly lower pressure due to back pressure in the stripper, then flow into the first stage 18 of a three-stage turbo compressor. This stage is driven by the methane expansion turbine 13. As will be seen, the pressure is raised to about 95 mm, and of course this results in a rise in temperature. The temperature is taken up in a first direct contact intercooler 19, which if fed with a portion of the stripped liquid from the pump 10, and the gases are brought back to approximately the initial temperature. They then flow through a second compressor 20 driven by the methane expansion turbine 14 and are brought up to a pressure of 266 mm, and of course again heated. These hot gases are then cooled down to about initial temperature in the second intercooler 21 which receives a further portion of the stripped liquid from the stripper 5. The cooled gases now pass into the third stage compressor 23, which is shown as driven by an outside power source, steam, by the turbine 24. The gases are brought up to substantially atmospheric pressure and again heated and then are cooled in an after-cooler 25 which receives a further stream from the pump 10. After again cooling down, they pass to the sulfur plant 16. The heated stripped liquid from the three intercoolers 19, 21 and 25 is pumped by pumps 26, 27 and 28, respectively, in a circuit including a bypass cooler 29. This stream finally is returned to the bottom of the absorber 1, as shown.

The exhaust from the steam turbine 24 passes into a conventional steam condenser 30, which is of standard design and is, therefore, shown only diagrammatically. The condensed steam and the heated water from the cooler 29 are cooled in a cooling tower 31, which is also of conventional design and so shown diagrammatically. The cooled water from the cooling tower is then pumped by the pump 32, part to the cooler 29 and part to the condenser 30. Any makeup water which may be needed can be introduced into the cold water line from the pump 32. As this is essentially the same as in FIG. 1, it is not shown.

The cooled stripped gases at atmospheric pressure from the after cooler 25 are then introduced into the modified Claus sulfur plant 16. As this plant is of a design which has been described in the literature, it is shown merely as a rectangle. The process carried out in the plant is slightly different from that described in the literature where the feed gas contains some oxygen, whereas in the present invention there is no oxygen and hence there is no unnecessary consumption of methane to burn up the free oxygen in the feed gas. Elemental sulfur is produced in the plant and emerges through the conduit 33, and this constitutes the final product of this modification of the present invention.

In the flow sheet described the off gases from the modified Claus process have an excess of $SO_2$. Theoretically 2 mols of $SO_2$ are required per 1 mole. However, preferably, an excess is used, which, as illustrated, results in about 2.3 mols of $SO_2$ per mol of methane. The gases leaving the plant 16 are, of course, quite hot and are passed through the recuperator 15, serving to preheat the incoming methane as was described above. They are cooled down to approximately ambient in the recuperator and are then recycled to the absorber, as shown on the drawing, joining the stream of incoming $SO_2$ containing gas from the copper converter. $CO_2$ and water vapor are vented from the absorber, as is shown on the drawings. The $SO_2$ content does not exceed 0.05%, which is the allowable figure from air pollution considerations. In normal operation the $SO_2$ content will usually be a little less, but its exact per centage is not critical so long as it is sufficiently low for venting to the atmosphere.

It will be noted that in the various cooling stages products are cooled down to the 27°C. temperature, which represents the ambient for the flow sheet. The stripping of $SO_2$ by methane in the absorber 5 results in cooling the water in this stripper several degrees and thus provides the necessary slight temperature differential for effecting cooling in the intercoolers and aftercooler, thus economizing cooling tower capacity. The flow sheet shows the stripping as being with methane. This does not mean that the methane has to be chemically pure, and it may be obtained from conventional sources, such as natural gas. It is well known that methane from such sources can be used to reduce $SO_2$ to sulfur in the modified Claus process, and the present invention does not change this situation.

I claim:

1. A process of concentrating $SO_2$ from feed gases containing less than about 3% $SO_2$, which comprises in combination,
   a. absorbing the gas in an aqueous solvent for $SO_2$, consisting essentially of water, at ambient pressure to produce a solution of $SO_2$ in the solvent,
   b. stripping the $SO_2$ from the solution produced by a fixed stripping gas at a sub-atmospheric pressure,
   c. expanding the stripping gas to the subatmospheric pressure of stripping in a gas expander to produce power and utilize the power produced as, for example, at least part of the power for compressing the off gas from the stripping and
   d. recompressing of gases from the stripping to substantially atmospheric pressure.

2. A process according to claim 1 in which the solvent from the stripping stage after stripping is recycled as an absorbing solvent in the absorption stage.

3. A process according to claim 1 in which the stripping gas is air.

4. A process according to claim 2 in which the stripping gas is air.

* * * * *